United States Patent [19]

Hoefer

[11] Patent Number: 4,689,366
[45] Date of Patent: Aug. 25, 1987

[54] SURFACE ACTIVE TERTIARY ALKYLAMINE EMULSIFIERS FOR POLYMERIZATION

[75] Inventor: Rainer Hoefer, Duesseldorf, Fed. Rep. of Germany

[73] Assignee: Henkel Kommanditgesellschaft auf Aktien, Duesseldorf, Fed. Rep. of Germany

[21] Appl. No.: 808,364

[22] Filed: Dec. 12, 1985

Related U.S. Application Data

[63] Continuation of Ser. No. 657,321, Oct. 3, 1984, abandoned.

[30] Foreign Application Priority Data

Oct. 17, 1983 [DE] Fed. Rep. of Germany ....... 3337640

[51] Int. Cl.$^4$ .............................................. C08F 2/30
[52] U.S. Cl. ................................... 524/724; 524/833; 526/209; 526/911
[58] Field of Search ................ 524/724, 245; 526/209, 526/911

[56] References Cited

U.S. PATENT DOCUMENTS

| | | | |
|---|---|---|---|
| 3,294,728 | 12/1966 | Kuhlkamp et al. | 524/724 |
| 3,988,508 | 10/1976 | Lissant | 526/911 |
| 4,171,278 | 10/1979 | Andree et al. | 252/548 |
| 4,229,547 | 10/1980 | Cohen et al. | 526/209 |
| 4,287,329 | 9/1981 | Heimberg | 526/209 |
| 4,435,524 | 3/1984 | Dinbergs | 526/209 |

FOREIGN PATENT DOCUMENTS 717076  2/1980  U.S.S.R. .............. 524/724

Primary Examiner—Edward J. Smith
Attorney, Agent, or Firm—Ernest G. Szoke; Henry E. Millson, Jr.

[57] ABSTRACT

Surface-active tertiary alkylamines comprising ethoxylated adducts of the reaction product of long-chain olefin oxides with ammonia or amines are useful in the emulsion polymerization of ethylenically unsaturated monomers.

17 Claims, No Drawings

SURFACE ACTIVE TERTIARY ALKYLAMINE EMULSIFIERS FOR POLYMERIZATION

This application is a continuation of application Ser. No. 657,321 filed Oct. 3, 1984, now abandoned.

BACKGROUND OF THE INVENTION

1. Field of the Invention

This invention relates generally to polymerization emulsifiers and, more specifically, to polymerization emulsifiers comprising surface-active tertiary alkylamines, obtainable by reacting long-chain epoxides with diethanolamine, followed by ethoxylation and, if desired, by salt formation or quaternization.

2. Statement of the Related Art

It is known that the polymerization of ethylenically unsaturated monomers substantially insoluble in water can be carried out in aqueous dispersion in the presence of emulsifiers. A large number of such emulsifiers, predominantly anionic, but also cationic and nonionic, have been described. One particularly important class of emulsifiers are the nonionic adducts of long-chain compounds and ethylene oxide.

Numerous nitrogen-containing polymerization emulsifiers are also known, such as the fatty amine salts proposed in pamphlet number HOE 4200 of Hoechst AG (West Germany). However, fatty amine salts lose their surface-active properties at basic pH-values, which is a disadvantage for many applications in the emulsion polymerization field. Ethoxylated fatty amines having a degree of ethoxylation below 10 have the same disadvantage. Other known polymerization emulsifiers include ethoxylated fatty acid amides produced by the amidation of fatty acid esters with ethanolamine or diethanolamine, followed by ethoxylation. Products of this type are described, for example, in German patent application No. 23 33 417. The disadvantage of these and similar products lies in the hydrolyzability of the amide function which can lead to a gradual loss of surface activity through hydrolysis. Adducts of ethylene oxide and/or propylene oxide with aliphatic diamines are also known and described, for example, in U.S. Pat. No. 2,979,528. Unfortunately, these adducts are not biodegradable.

Those skilled in the art are not able to predict with accuracy from the chemical structure the suitability of a given compound for use in emulsion polymerization. Accordingly, in view of the many requirements which polymer dispersions now must satisfy, there is a continuing need for new polymerization emulsifiers and, more especially, for new N-containing polymerization emulsifiers. In particular, there are applications which require emulsifiers capable of changing their surface-active properties through changes in pH.

DETAILED DESCRIPTION OF THE INVENTION

The present invention relates to polymerization emulsifiers comprising surface-active tertiary alkylamines corresponding to the following general formula I:

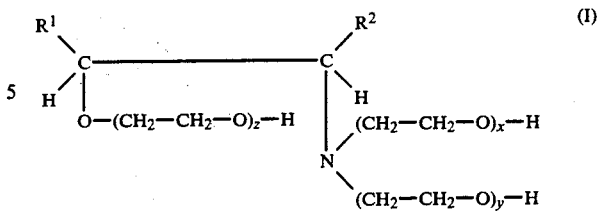

wherein $R^1$ and $R^2$ each independently of the other represents hydrogen or a linear alkyl group with $R^1$ and $R^2$ together containing from 6 to 22 carbon atoms, and x, y, and z are each integers of from 0 to 210 which together total from 10 to 210, preferably from 20 to 160, and more preferably from 35 to 150. Preferably, $R^1$ and $R^2$ together contain from 8 to 16 carbon atoms. The invention further relates to polymerization emulsifiers comprising reaction products of these compounds with mineral acids or with alkylating agents containing up to 3 carbon atoms. The compounds are useful as emulsifiers or co-emulsifiers in the emulsion polymerization of ethylenically unsaturated monomers and for stabilizing dispersions and latices obtained by the emulsion polymerization of ethylenically unsaturated monomers, and are employed in quantities of from about 0.5 to about 5% by weight, based on the total weight of the emulsion.

The surface-active tertiary alkylamines corresponding to the above formula which are used in accordance with the invention are per se known. They are described, for example, in U.S. Pat. No. 4,171,278 and in corresponding German patent applications 27 03 020, as ingredients of detergents. The use of these compounds as polymerization emulsifiers is neither described nor suggested in the literature, however, and the efficacy of the compounds in emulsion polymerization processes is unexpected.

The surface-active tertiary alkylamines corresponding to the formula I which are used in accordance with the invention can be produced in known manner from terminal or internal epoxyalkanes by a single-stage or two-stage reaction, in which the starting epoxyalkane is initially reacted with ammonia, ethanolamine, or diethanolamine to form the corresponding β-hydroxyalkylamine, which is then ethoxylated. The ethoxylated β-hydroxyalkylamine is subsequently reacted with a mineral acid or alkylating agent containing up to 3 carbon atoms, if desired, to form the corresponding acid addition salt or quaternary ammonium compound, respectively.

The epoxyalkanes used as starting materials are conventionally obtained, as by epoxidizing the corresponding monoolefins with percarboxylic acids or peroxides. Suitable monoolefins are conveniently obtained from mixed olefin products of the catalytic dehydrogenation or chlorination/dehydrochlorination of linear paraffins by selective extraction of the desired monoolefins from the mixtures. Monoolefins containing an internal double bond may also be produced by the isomerization of terminal olefins. 1,2-epoxyalkanes may be obtained from terminal monoolefins produced by polymerizing ethylene employing organic aluminium compounds as catalysts, or by the thermal cracking of paraffin wax. The emulsifiers of the invention are derived from epoxyalkane starting materials containing from 8 to 24 carbon atoms, and preferably from 10 to 18 carbon atoms. The epoxyalkanes are preferably employed in the form of mixtures of different chain lengths falling within the above preferred carbon atom range, which are conveniently obtained by fractional distillation of epoxidized monoolefin extracts. Typical useful mixtures of terminal epoxyalkanes have the following composition:

$C_{11}$–$C_{14}$ - fraction:
  22% by weight of $C_{11}$ 1,2-epoxyalkane
  30% by weight of $C_{12}$ 1,2-epoxyalkane
  26% by weight of $C_{13}$ 1,2-epoxyalkane and
  22% by weight of $C_{14}$ 1,2-epoxyalkane.

$C_{15}$–$C_{18}$ - fraction:
  16% by weight of $C_{15}$ 1,2-epoxyalkane
  32% by weight of $C_{16}$ 1,2-epoxyalkane
  43% by weight of $C_{17}$ 1,2-epoxyalkane and
  9% by weight of $C_{18}$ 1,2-epoxyalkane.

In general, $C_{11}/C_{14}$ and $C_{15}/C_{18}$ fractions of varying composition are particularly suitable as terminal epoxyalkane starting material.

The internal epoxyalkanes are preferably used in the form of a $C_{12}/C_{14}$-fraction or $C_{16}/C_{18}$-fraction, each fraction comprising, for example, about 70% by weight of the shorter-chain epoxyalkanes and about 30% by weight of the longer-chain epoxyalkanes.

The starting epoxyalkanes are reacted in known manner with ammonia, ethanolamine or diethanolamine to form the -hydroxyalkylamine intermediates. The reaction with ammonia is readily carried out with a 10-molar to 20-molar excess of ammonia under a pressure of from about 40 to about 150 atmospheres and at a temperature in the range of from about 160° to about 220° C. The reaction with monoethanolamine or diethanolamine can also be carried out under these conditions, although preferably at ambient pressure.

The hydroxyalkylamines thus obtained are ethoxylated by reaction with the required quantity of ethylene oxide at temperatures in the range of from about 80° to about 140° C. and, if desired, in the presence of a base (such as an alkali metal hydroxide or alkaline earth metal hydroxide) as catalyst.

To make them easier to handle, the surface-active, tertiary alkylamines used in accordance with the invention are desirably dissolved in water. The solutions are preferably diluted until they are easy to stir and meter. Solutions having solids content of from about 20 to about 50% by weight are generally suitable for this purpose. Before or after dissolution, the amines can be converted into their salts. To that end, they are neutralized in known manner with acids, especially mineral acids. Suitable mineral acids are hydrohalic acids (particularly hydrochloric acid and hydrobromic acid), sulfuric acid, and phosphoric acid.

The surface-active, tertiary alkylamines can also be converted in known manner into the corresponding quaternary ammonium compounds for use as emulsifiers. Alkylating agents containing up to 3 carbon atoms are suitable for this purpose. Preferred alkylating agents are methyl chloride, methyl bromide, methyl iodide, dimethyl sulfate, ethyl chloride, ethyl bromide, isopropyl chloride, isopropyl bromide, propyl chloride and propyl bromide. Where dimethyl sulfate is used, quaternization may be carried out in the absence of pressure and without an excess of quaternizing agent. Where the other quaternizing agents mentioned are used, quaternization is carried out at temperatures of up to about 100° C. and, if desired, with an excess of the quaternizing agent, for example, in about a 0.1 to 2 molar excess.

In the description herein, the expression "surface-active alkylamines" is understood to include the corresponding acid addition salts with mineral acids and also the corresponding quaternary ammonium compounds.

The surface-active tertiary amines of the invention are useful in the emulsion polymerization of a variety of monomers which are insoluble or partly insoluble in water. The surface-active products are useful in the emulsion polymerization of aromatic vinyl compounds, such as styrene, divinylbenzene or vinyltoluene, and also in the emulsion polymerization of polymerizable olefins and diolefins, such as propene, butadiene and isoprene.

The surface-active tertiary alkylmines are also useful in the emulsion polymerization of esters of acrylic acid or methacrylic acid with linear or branched $C_{1-16}$ alcohols, particularly in the emulsion polymerization of esters of the acids with $C_{1-8}$ alcohols especially methyl esters, ethyl esters, and butyl esters thereof.

The tertiary surface-active alkylamines are further useful used in the emulsion polymerization of vinyl esters of $C_{2-12}$ acids. Suitable monomers are, in particular, vinyl acetate, vinyl propionate and vinyl-2-ethylhexanoate. Exemplary additional monomers include vinylalkyl ethers containing $C_{1-6}$ -alkyl groups, vinyl chloride, and vinylidene chloride.

The above-mentioned monomers can be subjected to homopolymerization or copolymerization with other compounds of the type mentioned above in the presence of the surface-active alkylamines. Emulsion copolymerization reactions wherein up to about 50% by weight e.g., from about 10 to about 50% by weight, of monomers partly or completely soluble in water are present are generally contemplated. The following monomers are illustrative suitable comonomers: acrylonitrile, methacrylonitrile, $C_{1-8}$ semiesters of maleic acid or fumaric acid, acrylic acid, methacrylic acid, maleic acid, fumaric acid, crotonic acid and/or itaconic acid.

The monomer dispersions prepared with surface-active alkyl-amine emulsifiers of the invention are characterized by a ratio by weight of monomer to water of from about 1:5 to about 2:1 (preferably from about 1:3 to about 1:1), depending upon the particular application.

The surface-active alkylamines can be used according to the invention in the presence of standard polymerization auxiliaries, especially including conventional polymerization initiators. Inorganic peroxide compounds such as calcium or ammonium persulfate or hydrogen peroxide are exemplary initiators. It is also possible to use organic peroxide compounds or organic azo compounds, providing they are suitable for emulsion polymerization. The initiators are used in the usual quantities, i.e. in quantities of from about 0.05 to about 2% by weight (preferably in from about 0.1 to about 0.5% by weight). Other suitable auxiliaries are buffers, such as sodium hydrogen carbonate, sodium pyrophosphate, ammonium chloride or sodium acetate which can be used in quantities of up to about 2% by weight. Accelerators, such as formaldehyde sulfoxylate, can also be used.

The surface-active alkylamines can also be used according to the invention in conjunction with standard molecular weight regulators of the type customarily used for emulsion polymerization, for example butenol or conventional organic thio compounds, such as mercaptoethanol, thioglycolic acid, octyl mercaptan or tertiary dodecyl mercaptan.

The surface-active alkylamines are suitable for use as sole emulsifiers (primary emulsifiers). In practice, however, it may be advantageous to use them in conjunction with from about 0.5 to about 5% by weight, based on the total weight of the emulsion, of one or more of conventional cationic, nonionic, or even anionic emulsifier. Cationic emulsifiers or nonionic emulsifiers suitable as co-emulsifiers include fatty amine salts, for example salts of $C_{12-18}$-amines with mineral acids, ethoxylated fatty amines, fatty acid monoethanolamides, diethanolamides and the quaternization products obtainable therefrom, as well as adducts of ethylene oxide and/or propylene oxide with aliphatic diamines, for example the products commercially available under the trademark TETRONIC (a product of Wyandotte Chemical Co.). Other nonionic emulsifiers which may be combined with the alkylamines used in accordance with the invention include in particular alkyl phenol or fatty alcohol ethoxylates.

Emulsification with the surface-active alkylamines in combination with anionic emulsifiers also generally gives favorable results. In some cases, however, incompatibility (precipitation) may occur, so that it is advisable to determine by a preliminary test whether the particular anionic emulsifier selected is compatible with the surface-active alkylamine used in accordance with the invention. A preliminary test may be carried out by mixing approximately 1% aqueous solutions of the two emulsifiers and observing whether any deposits or precipitates are formed. Anionic emulsifiers suitable for combination with the surface-active alkylamines used in accordance with the invention include soaps of natural or synthetic fatty acids, disproportionate resinic acids, water-soluble salts of branched monocarboxylic acids (produced for example by the Guerbert rection), fatty alcohol sulfates, fatty alcohol ether sulfates, alkyl phenol ether sulfates and sulfonates, alkylbenzene sulfonates, paraffin sulfonates and/or alkyl naphthalene sulfonates. Other suitable anionic emulsifiers are water-soluble salts of sulfonated oils, fats, fatty acids, fatty acid alkylesters, fatty acid ethoxylates, and fatty acid alkanolamides. It is also possible to use sulfosuccinic acid semiesters and sulfosuccinic acid diesters in the form of their sodium or ammonium salts, alkyl or alkyl phenol (ether) phosphates, alkylisothionates, and also condensation products of oxy- and aminoalkanol sulfonic acids and/or alkyl diphenylether sulfonates.

Emulsion polymerization processes employing surface-active alkylamines as emulsifiers in accordance with the invention broadly includes those emulsion polymerization techniques known in the art. It is possible, for example, initially to introduce and polymerize the entire emulsion in a batch process. The polymerization process may be carried out by running in the monomer or by running in the emulsion in a continuous process. In general, the temperature of the polymerization medium is kept in the range of from about 40° to about 100° C. and preferably in the range from about 50° to 90° C. The polymerization process is best preferably carried out at a pH in the range of from about 3 to about 9 depending on the monomers used, and again depending on the monomers used, either at ambient pressure or under increased pressure (for example, where vinylchloride or butadiene is used, pressure is desirable).

The emulsion polymerization processes are preferably carried out in coolable and heatable vessels equipped with stirrers and temperature gauges as is well known in the art, typically stirrer-equipped pressure vessels. However, it is also possible to use tubular coil reactors, loop reactors, or other well-known equipment.

On completion of polymerization, the polymer dispersions prepared using the surface-active alkylamines in accordance with the invention are preferably cooled and removed from the vessel through sieves. If the solid product is to be isolated, the polymer dispersion is preferably precipitated or spray-dried, although it may be preferred in many applications to use the dispersions directly, for example as binders for adhesives or coating compositions.

Dispersions produced with the surface-active alkylamines in accordance with the invention are especially characterized by good stability and low coagulate content. The emulsifiers of the invention are characterized by low toxicity, especially in comparison to fatty amines. It is particularly noteworthy that initial low toxicity of the compounds continues to fall with increasing degree of ethoxylation. Emulsifiers according to the invention based, for example, on an adduct comprising the reaction product of a $C_{12}/C_{14}$ epoxyalkane fraction and diethanolamine ethoxylated with 28 moles of ethylene oxide, are harmless to fish and water organisms.

EXAMPLE I

| Copolymerization of vinylacetate-vinylversatate | | | |
|---|---|---|---|
| | Example | | |
| | Ia | Ib | Ic (Comparison) |
| | (quantities in g) | | |
| Solution 1 | | | |
| Dist. water | 250 | 250 | 250 |
| Anion-active emulsifier | 5.0 | 5.0 | 5.0 |
| Potassium peroxodisulfate | 0.5 | 0.5 | 0.5 |
| Borax | 0.5 | 0.5 | 0.5 |
| Solution 2 | | | |
| Dist. water | 243 | 243 | 243 |
| Anion-active emulsifier | 6.0 | 6.0 | 6.0 |
| Emulsifier according to the invention | 12.0 | 12.0 | — |
| Nonionic emulsifier | — | — | 12.0 |
| Potassium peroxodisulfate | 2.0 | 2.0 | 2.0 |
| Borax | 2.0 | 2.0 | 2.0 |
| Solution 3 | | | |
| Vinylacetate | 334 | 334 | 334 |
| VERSATIC 10 ACID, a trademark of Shell Chemical Co. for $C_{10}$ cyclic tertiary acids | 141 | 141 | 141 |
| Acrylic acid | 4 | 4 | 4 |
| | 1000 | 1000 | 1000 |
| Coagulate content | 0% | 0% | 0% |
| Dry residue (theoretical) | 49.1% (49.9%) | 49.5% (49.9%) | 50.1% (49.9%) |
| Particle size | approx. 0.1 um | >0.1 um | approx. 0.1 um |

The anion-active emulsifier used was an Na-α-sulfo-$C_{16}/C_{18}$-fatty acid methyl ester containing 30.0% of active substance and an α-sulfo-$C_{16}/C_{18}$-fatty acid, disodium salt content of 6%.

Emulsifiers according to the invention tested were the ring-opening product of a mixture of:
$C_{12}$ 1,2-epoxyalkane (approximately 70% by weight) and
$C_{14}$ 1,2-epoxyalkane (approximately 30% by weight) with diethanolamine, reacted with:
Example Ia: 60 moles of ethylene oxide
Example Ib: 100 moles of ethylene oxide The non-ionic emulsifier of comparison Example Ic was tallow fatty alcohol +8 E.O..

Apparatus:

Closed, heatable 2 liter surface-ground vessel equipped with a V4 A-anchor stirrer, dropping funnel, reflux condenser and a 2 liter feeder vessel equipped with a flat paddle stirrer.

Procedure:

A monomer pre-emulsion was prepared by adding the monomer mixture (solution 3) with stirring to the aqueous phase (solution 2). This pre-emulsion had a pH of 3.8 to 5.0. The reactor filling (solution 1) was heated and, when the temperature has reached 80° C., the monomer pre-emulsion was added over a period of from two to two and a half hours. On completion of the addition, the temperature of the reaction mixture was kept at 80° C. for another two hours. The dispersion was cooled and filtered, and the pH was adjusted to approximately 7 with a 10% ammonium carbonate solution.

Performance properties:

| Performance Properties: | | Ia | Ib | Ic |
|---|---|---|---|---|
| Particle size (nm) | | 166 | 159 | 169 |
| Mechanical stability (% coagulate) | | 0 | 0 | 0 |
| Brookfield viscosity at 25° C. (mPa.s) | | 223 | 316 | 404 |
| Electrolyte stability (% coagulate) | | | | |
| NaCl | 1 percent | 0 | 0 | 0 |
| | 10 percent | 0 | 0 | 100 |
| $CaCl_2$ | 1 percent | 0 | 0 | 0 |
| | 10 percent | 0 | 0 | 100 |
| $Al_2(SO_4)_3$ | 1 percent | 0 | 0 | 0 |
| | 10 percent | 100 | 0 | 100 |
| Film assessment | | | | |
| at room temperature | | clear, transparent | | |
| at 105° C. | | yellowish, transparent | | |
| Water uptake (%) | | 17.1 | 11.0 | 47.2* |

*film surface very porous after drying

Test methods:

1. Coagulate content after preparation

The prepared dispersion was poured into a tared Schwegmann-Perlon filter bag having a mesh width of 80 microns. The filter bag together with any coagulate present was dried for 24 hours at 105° C. and the coagulate determined by differential weighing.

2. Dry substance content

Dry residue determinations were made using an apparatus of the Satorius 709301 type. The solids content was determined at stage 7 (drying time: 20 minutes). The weighed quantity amounts to approximately 5 g.

3. Determination of particle size

The average particle size was determined by light scattering in a Coulter Nano-Sizer (trademark of Coulter Electronics GmbH, Krefeld, West Germany).

4. Mechanical stability 80 g of the dispersion were stirred for 30 minutes at 14,000 r.p.m. using a Klaxon type HM UB 2 stirrer (Klaxon Ltd.) and then filtered through a Schwegmann 80 micron filter bag. The coagulate content was determined by drying and differential weighing of any coagulate remaining in the filter bag (in accordance with ASTM D 1076).

5. Viscosity

Viscosity was measured at 20° C. using a Brookfield type RVT viscosimeter.

6. Electrolyte stability

Quantities of 10 ml of each of the undiluted polymer dispersion were each homogeneously mixed with 10 ml of the following salt (electrolyte) solutions:

NaCl-solution: 1 percent and 10 percent
$CaCl_2$-solution: 1 percent and 10 percent
$Al_2(SO_4)_3$-solution: 1 percent and 10 percent The coagulate formed was dried and determined by differential weighing.

7. Film assessment

Two films were drawn from each dispersion using a drawing rule (gap width approximately 1 mm).

One film was dried for 48 hours at room temperature and the other film for 24 hours at 105° C.

In each case, the films were assessed for color and transparency.

8. Water uptake

A film from each dispersion measuring 75×35×0.5 mm was dried for 48 hours at 50° C. in a recirculating air drying cabinet, subsequently weighed, and then stored in deionized water for 24 hours. Thereafter the film was carefully dried by dabbing with cellulose cloths and the percentage weight increase determined.

EXAMPLE II

| Homopolymerization of n-butylacrylate | | |
|---|---|---|
| Distilled water | 466.89 g | |
| Emulsifier according to the invention (the emulsifier used in Example Ia above) | 22.96 g | solution 1 |
| Ammonium peroxodisulfate | 1.15 g | |
| n-Butylacrylate | 450.00 g | solution 2 |
| Methacrylic acid | 9.00 g | |
| Distilled water | 45.85 g | solution 3 |
| Sodium disulfite | 1.15 g | |
| Polymer dispersion | 1000.00 g | |

Procedure:

1.15 g of ammonium peroxodisulfate and 22.96 g of emulsifier were dissolved in 466.89 g of distilling water in the feeder vessel (solution 1). 150 ml of the resulting solution were introduced into the reaction vessel. The monomers (solution 2) were added to the remainder of solution 1, followed by intensive emulsification for 15 minutes. 150 ml of the resulting pre-emulsion were then introduced into the reaction vessel which was then purged with nitrogen while stirring for 30 minutes. 20 ml of the sodium disulfite solution (solution 3) accommodated in the dropping funnel were then run into the reaction vessel, and heating commenced. Polymerization began at between 50° C. and 60° C. with an increase in temperature. The monomer emulsion from the feeder vessel and the remainder of solution 3 were then introduced at the same time over a period of 1 to 1.5 hours, during which time the temperature was kept at between 65° C. to 68° C. The emulsion was then stirred for 1 hour at about 70° C. and subsequently cooled. The pH of the emulsion was adjusted to approximately 6–7 with 25% ammonia. After some readily filterable coagulate fractions were filtered off, a storable, speck-free polymer dispersion having a particle size of approximately 0.1 um (visual assessment) was obtained.

I claim:

1. A process for stabilizing dispersions and latices obtained by the emulsion polymerization or copolymerization of ethylenically unsaturated monomers insoluble or partly soluble in water comprising polymerizing or copolymerizing the monomers in an aqueous polymerization medium in the presence of from about 0.5 to about 5% by weight of at least one of (a) a tertiary amine emulsifier of the formula:

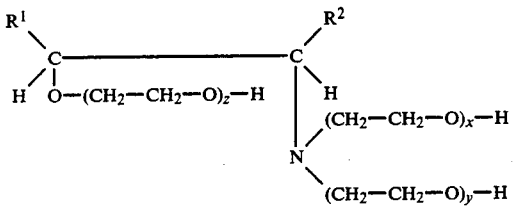

in which $R^1$ and $R^2$ each independently of the other represent hydrogen or a linear alkyl group, with $R^1$ and $R^2$ together containing from 6 to 22 carbon atoms; and x, y and z are each integers of from 0 to 150 which, together, total from 35 to 150; (b) or an acid addition salt thereof with a mineral acid; or (c) a quaternary ammonium compound thereof with an alkylating agent containing up to 3 carbon atoms, wherein said insoluble or partly soluble monomers are vinyl acetate or an ester of acrylic acid with a $C_1$–$C_8$ alcohol.

2. The process of claim 1, wherein the radicals $R^1$ and $R^2$ together contain from 8 to 16 carbon atoms.

3. The process of claim 2, wherein either $R^1$ or $R^2$ is hydrogen.

4. The process of claim 1, wherein the emulsifier is an acid addition salt of the tertiary alkylamine with a mineral acid.

5. The process of claim 4, wherein the mineral acid is hydrochloric, hydrobromic, sulfuric, or phosphoric acid.

6. The process of claim 1, wherein the emulsifier is the quaternary ammonium reaction product of the surface-active tertiary alkylamine with a methyl, ethyl, or propyl halide; or dimethyl sulfate.

7. The process of claim 6, wherein the methyl halide is methyl chloride or methyl bromide.

8. The process of claim 1, wherein the emulsifier includes a coemulsifier which is at least one of a nonionic, cationic, and anionic emulsifier.

9. The process of claim 1, wherein the tertiary alkylamine is derived from a terminal $C_{8-24}$-epoxyalkane.

10. The process of claim 1, wherein the tertiary alkylamine is derived from an internal $C_{8-24}$-epoxyalkane.

11. The process of claim 1, wherein the partly soluble or insoluble ethylenically unsaturated monomers are copolymerized with a monomer soluble in water.

12. The process of claim 1, wherein the tertiary alkylamine is derived from a mixed fraction of terminal $C_{10-19}$ epoxyalkanes by reaction of the epoxy-alkanes with ammonia, ethanolamine, or diethanolamine followed by ethoxylation of the reaction product.

13. The process of claim 1, wherein the tertiary alkylamine is derived from a mixed fraction of internal $C_{10-18}$ epoxyalkanes by reaction of the epoxyalkanes with ammonia, ethanolamine, or diethanol amine followed by ethoxylation of the reaction product.

14. A process in accordance with claim 1 wherein the polymerization or copolymerization is carried out at a temperature in the range of from about 40° to about 100° C. and at a pH in the range of from about 3 to about 9.

15. The process of claim 1, wherein said insoluble or partly soluble monomers are vinyl acetate.

16. The process of claim 1, wherein said insoluble or partly soluble monomers are $C_1$–$C_8$ acrylate.

17. The process of claim 16, wherein said insoluble or partly soluble monomers are butyl acrylate.

* * * * *